(12) United States Patent
Allison et al.

(10) Patent No.: US 7,050,562 B2
(45) Date of Patent: May 23, 2006

(54) METHODS, SYSTEMS, AND COMPUTER PROGRAM PRODUCTS FOR FLEXIBLE GLOBAL TITLE TRANSLATION (GTT) LOAD SHARING

(75) Inventors: Rick L. Allison, Cary, NC (US); Peter J. Marsico, Chapel Hill, NC (US); Raghavendra G. Rao, Cary, NC (US)

(73) Assignee: Tekelec, Calabasas, CA (US)

( * ) Notice: Subject to any disclaimer, the term of this patent is extended or adjusted under 35 U.S.C. 154(b) by 115 days.

(21) Appl. No.: 10/878,171

(22) Filed: Jun. 28, 2004

(65) Prior Publication Data

US 2005/0013290 A1 Jan. 20, 2005

Related U.S. Application Data

(60) Provisional application No. 60/483,501, filed on Jun. 27, 2003.

(51) Int. Cl.
*H04M 7/00* (2006.01)

(52) U.S. Cl. ............... 379/221.01; 379/221.2

(58) Field of Classification Search ............... None
See application file for complete search history.

(56) References Cited

U.S. PATENT DOCUMENTS

| | | | |
|---|---|---|---|
| 6,098,076 A | | 8/2000 | Rekieta et al. |
| 6,101,494 A | * | 8/2000 | Khosravi-Sichani et al. ... 707/3 |
| 6,108,409 A | | 8/2000 | Cooper et al. |
| 6,230,164 B1 | | 5/2001 | Rekieta et al. |
| 6,282,280 B1 | | 8/2001 | Rekieta et al. |
| 6,795,546 B1 | * | 9/2004 | Delaney et al. ............. 379/229 |

* cited by examiner

*Primary Examiner*—Creighton Smith
(74) *Attorney, Agent, or Firm*—Jenkins, Wilson, Taylor & Hunt, P.A.

(57) ABSTRACT

Methods, systems, and computer program products for flexible global title translation load sharing are disclosed. GTT load sharing groups are defined. Each GTT load sharing group may include one or more point codes. At least one of the point codes may appear in more than one of the GTT load sharing groups. When signaling messages requiring GTT are received, the signaling messages are load shared using the GTT load sharing groups.

50 Claims, 3 Drawing Sheets

METHODS, SYSTEMS, AND COMPUTER PROGRAM PRODUCTS FOR FLEXIBLE GLOBAL TITLE TRANSLATION (GTT) LOAD SHARING

RELATED APPLICATIONS

This application claims the benefit of U.S. Provisional Patent Application Ser. No. 60/483,501, filed Jun. 27, 2003, the disclosure of which is incorporated herein by reference in its entirety.

TECHNICAL FIELD

The present invention relates to load sharing messages that are sent route-on-global-title. More particularly, the present invention relates to methods and systems for flexible GTT load sharing.

BACKGROUND ART

In telecommunications signaling networks, global title translation or GTT refers to the process by which the signaling connection control part (SCCP) called party address in a signaling message is translated into the point code of an intermediate or final destination. In intermediate global title translation, the SCCP called party address is translated into the point code of an intermediate destination. In final global title translation, the SCCP called party address is translated into the point code and subsystem number of a final destination.

In some networks, it may be desirable to load share messages that are sent route-on-global-title. For example, some nodes, such as service control points (SCPs), may be redundantly provided in a telecommunications network. That is, multiple identically provisioned service control points may be present in a network for enhanced reliability and/or for increasing the speed at which SCP services are provided. In some networks, each of the redundant service control points may have a separate point code, and other network nodes may rely on global title translation to route messages to the SCPs. However, because conventional global title translation associates a global title address with a single point code, load sharing requires an extension to conventional global title translation.

In one extension of conventional global title translation, a global title address is first translated into an initial point code. A mated application table containing the initial point code and the point codes of mated applications is then accessed using the initial point code. The final point code to be inserted in the message is selected from the initial point code and the mated application point codes based on relative cost. As a result, load sharing can occur between mated applications defined in the mated application table.

One shortcoming of this conventional type of load sharing is that the load sharing relationships between GTT destination point codes is global in the GTT tables. That is, a point code can only be associated with one set of mated application point codes in the mated application table. In addition, because the point code can only be associated with one set of mated application point codes, each point code can only be associated with a single load sharing algorithm. For example, if a point code is associated with two other mated application point codes and each point code is associated with a relative cost of 10, the load sharing algorithm will be to route 33% of received messages to each point code. There is no ability given the current global nature of point codes in GTT-related load sharing tables to define different load sharing algorithms that involve the same destination point code.

Accordingly, in light of these difficulties associated with conventional GTT load sharing, there exists a need for improved methods, systems, and computer program products for flexible global title translation load sharing.

DISCLOSURE OF THE INVENTION

According to one aspect, the invention includes a method for flexible global title translation load sharing. According to this method, GTT load sharing groups are defined. Each GTT load sharing group may include one or more point codes among which a load sharing relationship is defined. The same point codes may appear in more than one GTT load sharing group. In addition, different load sharing algorithms can be defined for different load sharing groups. As a result, different load sharing relationships can be defined for the same point code or set of point codes.

When a message requiring GTT is received, a lookup is performed to determine a load sharing group code. The GTT load sharing group code is used to select a GTT load sharing group for the message. Once a GTT load sharing group is selected, a destination point code is selected from the point codes in the GTT load sharing group using the load sharing algorithm defined for the group. In one implementation, the load sharing algorithm may be a round-robin-based algorithm that gives preference to the destination point code determined in the GTT lookup.

The functionality described herein for flexible GTT load sharing may be implemented in hardware, software, firmware, or any combination thereof. In one exemplary implementation, the functionality for flexible GTT load sharing may be implemented as a computer program product comprising computer executable instructions embodied in a computer readable medium. Exemplary computer readable media suitable for use with embodiments of the present invention include memory storage devices, such as chip memories, disk memories, or downloadable electrical signals that store computer-executable instructions for performing the flexible GTT load sharing functionality described herein.

As described above, the present invention allows multiple load sharing relationships to be defined for the same point code or group of destination point codes associated with GTT processing in a telecommunications signaling network. In one implementation, GTT processing according to the present invention is performed at a signaling message routing node, such as a signal transfer point (STP). The present invention has potential value to any network operator who uses GTT to route messages and wishes to establish different load sharing relationships among replicated or redundant destination entities, such as SS7 service control points or message processing subsystems that are integrated within or associated with a network node. For example, a network operator may have two redundant line information database (LIDB) SCP nodes deployed in a signaling network. The operator may wish to have all LIDB query message traffic load shared equally between the two SCP nodes. A network routing node, such as an STP, may be configured to perform GTT processing on received LIDB query messages and load share the query messages equally between the two SCP nodes. However, if the network operator desires to send a signaling message (e.g., a control message, a provisioning message, a query message, etc.) to a specific one of the two LIDB SCP nodes using global title routing, a problem arises.

While a message may be directly message transfer part (MTP) addressed to the desired SCP node, there is currently no method known in the industry for global title routing a message to a specific one of many load-shared SCP nodes in a network. The present invention solves this problem.

According to one exemplary invention the present invention, the load sharing algorithm to be used for a particular message may be selected based on global title address (GTA) digits contained in the message. Exemplary signaling messages that may be selectively global title routed according to the present invention include signaling connection control part (SCCP) messages, transaction capabilities application part (TCAP) messages, mobile application part (MAP) messages, and Internet Engineering Task Force (IETF) SIGTRAN SCCP user adaptation (SUA) messages. Global title address information that may be used to translate the messages may include dialed digit or called party identification information (e.g., mobile subscriber ISDN (MSISDN) number, mobile identification number (MIN), international mobile station identifier (IMSI)). The called party identification information may be contained in any of the SCCP, TCAP, MAP, or SUA layers of a signaling message.

For applying the flexible GTT load sharing methods to SUA messages, the global title address and/or other parameters used for flexible GTT load sharing may be extracted from the destination address field of an SUA connectionless data transfer message (CLDT). An SUA CLDT message is similar to an SCCP UDT message. Flexible GTT load sharing may be implemented by performing GTT using the parameters extracted from the destination address field and using the result to select a GTT load sharing group. The final destination for the SUA message may be determined by selecting a point to insert in the destination address field of the CLDT message from the point codes in the group.

In addition to or instead of performing flexible GTT load sharing based on information in the destination address field in an SUA message, flexible GTT load sharing may also be performed based on parameters stored in the routing context field of an SUA message. The routing context is a four byte field. The four byte field can contain parameters any application-identifying parameters, such as DPC/SSN and/or transaction ID. The contents of the routing context field are not specification driven and are used by the two nodes interacting in a routing context to uniquely identify applications. Accordingly, parameters extracted from the SUA routing context field may be used to select a GTT load sharing group. A routing context parameter may be selected from the parameters in the GTT load sharing group using the load sharing algorithm defined for the group. Thus, flexible GTT load sharing may be performed for SUA messages using any parameter used to identify a node or a specific application running on a node.

Additional signaling message information may be used in conjunction with the GTA digit information during GTT processing to select the GTT load sharing group and corresponding load sharing algorithm for a received signaling message. This signaling message information may include a message transfer part (MTP) origination point code (OPC), an SCCP subsystem (SSN), a translation type (TT), a numbering plan (NP), a nature of address indicator (NAI), and calling party address information. Calling party address information may include calling party or calling subscriber identification information contained in any of the SCCP, TCAP, MAP or SUA layers of a signaling message. For SUA messages, calling party address information used for flexible GTT load sharing may be extracted from the source address field of the SUA messages. Furthermore, calling party address information may include information that identifies a network entity, such as a location routing number (LRN).

The following acronyms and definitions apply throughout this document.

TABLE 1

Acronyms

| Acronym | Description |
|---------|-------------|
| GTA | Global Title Address |
| GTT | Global Title Translation |
| MAP | Mated Application (table) |
| MAP | Mobile Application Part |
| MRN | Mated Relay Node (table) |
| PC | Point Code |

Intermediate GTT—A global title translation that results in a point code of an intermediate destination. A node that performs intermediate GTT translates the GTA digits in the message to a point code corresponding to a second node and sends the message route-on-global-title to the second node. The first node may or may not modify the GTA digits before sending to the second node. The second node performs another global title translation, which could be another intermediate GTT, or it could be a final GTT (see below).

Final GTT—A global title translation that results in a point code and subsystem number of a final MTP destination. The node performing the final GTT translates the GTA digits in the message to the point code and subsystem number corresponding to the final destination node for the message. After translation, the node sends the message route-on-point-code-subsystem-number to the next hop in the routing path. The next hop in the routing path may or may not be the final destination. Although no subsequent GTTs will be performed, the message may be MTP-routed through several more nodes before reaching its final destination.

Based on traditional methods deployed in networks today, the user is not able to define different load sharing relationships between the same group of destinations or to define different groups of destinations which may contain overlapping point codes. In other words, the load sharing relationships established between post-GTT destination point codes are global across all GTAs that translate to any one of those point codes.

For example, the Eagle® signal transfer point available from Tekelec of Calabasas, Calif., currently load shares post-GTT destinations through the use of the Mated Application (MAP) table for final GTT or the Mated Relay Node (MRN) table for intermediate GTT. In one example, a user may define GTA=9194605500 in the GTT tables with a translation to PC=1-1-1. The user may then define a relationship in the MAP table between PCs 1-1-1 and 2-2-2. The relative costs between the two PCs are equal, meaning all traffic routed using GTA=919460550 will be divided equally between the two PCs. The user may define another GTA=9194611000 in the GTT tables, also with a translation to PC=1-1-1. Because of the previously defined relationship between 1-1-1 and 2-2-2, all traffic routed using this GTA will also be divided equally between those two PCs. Because the current methods only allow one set of relationships to be defined between a given PC and any other PC(s), all GTAs in the GTT table that translate to 1-1-1 will have the same set of load sharing rules applied.

Many network operators have a need for more flexible rule assignment for post-GTT load sharing. One implementation of a flexible GTT load sharing feature of the present invention allows different relationships to be established between the same group (or subgroup) of destinations. The load sharing relationship to be used for a particular message may be selected based on the GTA in the message. For example, in the scenario above, GTA=9194605500 may translate to PC=1-1-1 and indicate a load sharing relationship with PC=2-2-2, while GTA=9194611000 may also translate to PC=1-1-1, but indicate there is no load sharing with any other PC. Furthermore, GTA=9193881416 may also translate to PC=1-1-1, but indicate a load sharing relationship with PC=2-2-2 and PC=3-3-3. Thus, traffic routed to GTA=9194605500 can be divided equally between 1-1-1 and 2-2-2, traffic routed to GTA=9194611000 would be sent only to 1-1-1, and traffic routed to GTA=9193881416 can be divided equally between 1-1-1, 2-2-2, and 3-3-3. Other non-equal relationships (such as active/standby) may also be established per the Eagle's® standard relative routing cost capabilities.

These standard relative routing cost capabilities may include selecting a point code from multiple point codes in the MAP or MRN table based on relative costs assigned to each point code. For example, a network operator desiring to have traffic load shared equally between two point codes may assign the same relative cost to each of the two point codes. The Eagle® STP may load share traffic equally between the two point codes by selecting between the point codes in a round robin manner for each message that global title translates to one of the point codes. If the relative costs assigned to the point codes are not equal, the point code assigned to a message depends on the point code used to access the MAP or MRN table. For example, if three point codes are assigned relative costs of 5, 10, and 15, the GTA in a message translates to the point code corresponding to 10, and 10 is available, the message will be assigned the point code corresponding to 10. If 10 is not available, the message will be assigned the point code corresponding to 15, because 15 is the next entry in the table. If 15 is not available, the message will be assigned the point code, the point code corresponding to 5. Thus, the original point code determined in the translation of the global title address is treated as a preferred point code in situations where entries in the MAP or MRN tables do not have equal weights. If the preferred point code is available, the messages assign that point code. If the preferred point code is not available, point codes are selected in a round robin manner. That is, each message will select the next point code in the group.

Although this preference-based load sharing algorithm may be used to load share messages among point codes within GTT load sharing groups, the present invention is not limited to using this algorithm. In an alternate implementation, a lowest cost load sharing algorithm may be used. In this algorithm, messages may be assigned a point code corresponding to the lowest cost. If that point code becomes unavailable, messages may be assigned a point code corresponding to the next lowest cost, and so forth. Any suitable method for load sharing messages based on selection of members in a load sharing group is intended to be within the scope of the invention.

Accordingly, it is an object of the invention to provide methods, systems, and computer program products for flexible GTT load sharing.

It is another object of the invention to provide methods, systems, and computer program products for defining GTT load sharing groups that share members with other GTT load sharing groups.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Currently, the Eagle's® GTT, MAP, and MRN tables are organized as shown in Tables 2–4 below.

TABLE 2

GTT Table

| GTA | PC |
|---|---|
| 9194611000 | 1-1-1 |
| 9195491300 | 4-4-4 |

TABLE 3

Mated Application (MAP) Table

| | PC/SSN | Rel Cost |
|---|---|---|
| Primary | 1-1-1/10 | 10 |
| Mate | 2-2-2/10 | 10 |
| Mate | 3-3-3/10 | 20 |

TABLE 4

Mated Relay Node (MRN) Table

| | PC | Rel Cost |
|---|---|---|
| Primary | 4-4-4 | 10 |
| Mate | 5-5-5 | 10 |
| Mate | 6-6-6 | 10 |

The MAP table includes PC/SSN combinations, while the MRN table includes only PC. This is due to the fact that the MAP table is used for final GTT, while the MRN table is used only for intermediate GTT and does not need SSN. Because of the methods currently in use, the Eagle's® tables are constructed such that the same PC cannot be entered twice into a given table. The result of this is that a given PC can only have one set of mated nodes and one set of relative cost relationships to those nodes. Defining the same PC with a different set of mated nodes or a different set of relative costs is not possible. Also, the only way to define a GTA translation is to a single point code. A final GTT analysis of GTA 9194611000 and any other GTAs in the GTT table that translate to PC=1-1-1 will result in a match in the MAP table showing a load sharing relationship between 1-1-1 and 2-2-2, with a backup of 3-3-3. This does not allow a distinction between translations based on GTA.

Figure 1:
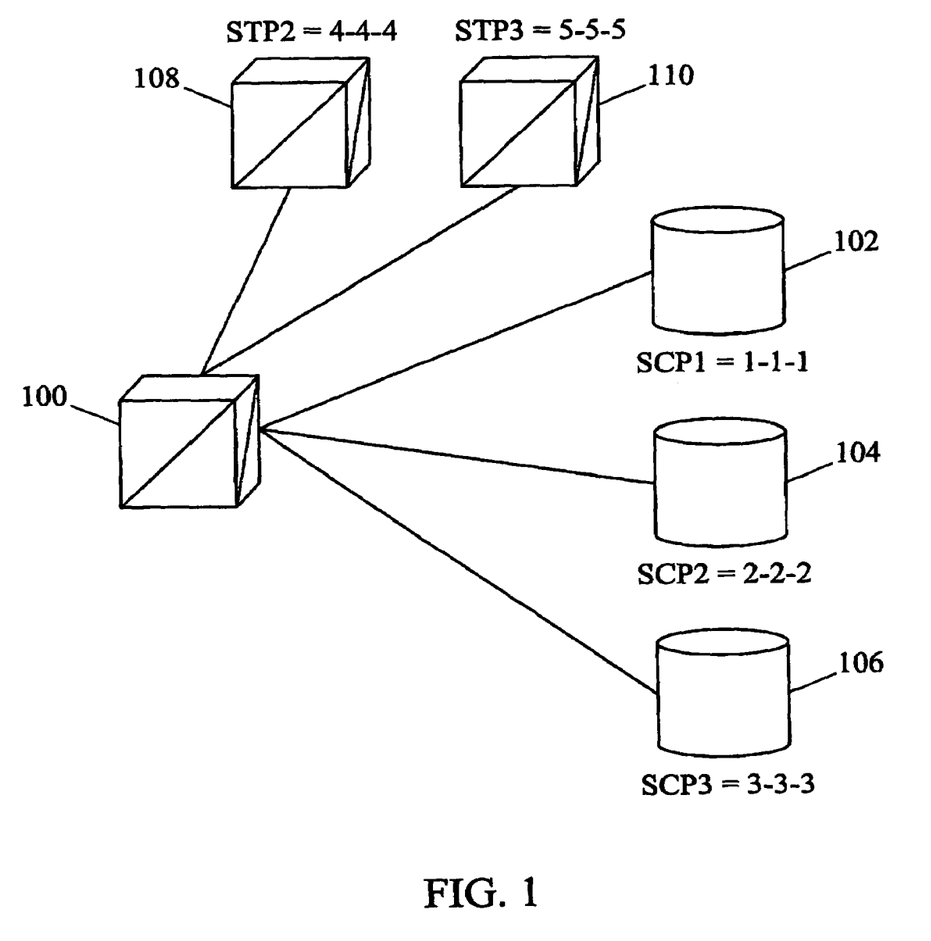
FIG. 1 is a network diagram illustrating a signal transfer point including flexible GTT load sharing functionality according to an embodiment of the present invention.

FIG. 1 is a network diagram illustrating a network including a signal transfer point having flexible GTT load sharing functionality according to an embodiment of the present invention. Referring to FIG. 1, STP 100 may include flexible GTT load sharing functionality that allows different load sharing relationships to be defined among SCPs 102, 104, and 106 for final global title translation and among STPs 108 and 110 for intermediate global title translation. SCPs 102, 104, and 106 may be conventional SCPs that support PSTN and/or IP telephony functions. Examples of functions that may be supported by SCPs 102, 104, and 106 include LIDB, CNAM, number portability, HLR, VLR, etc. STPs 108 and 110 may be conventional STPs that perform MTP routing and conventional global title translation.

Figure 2:
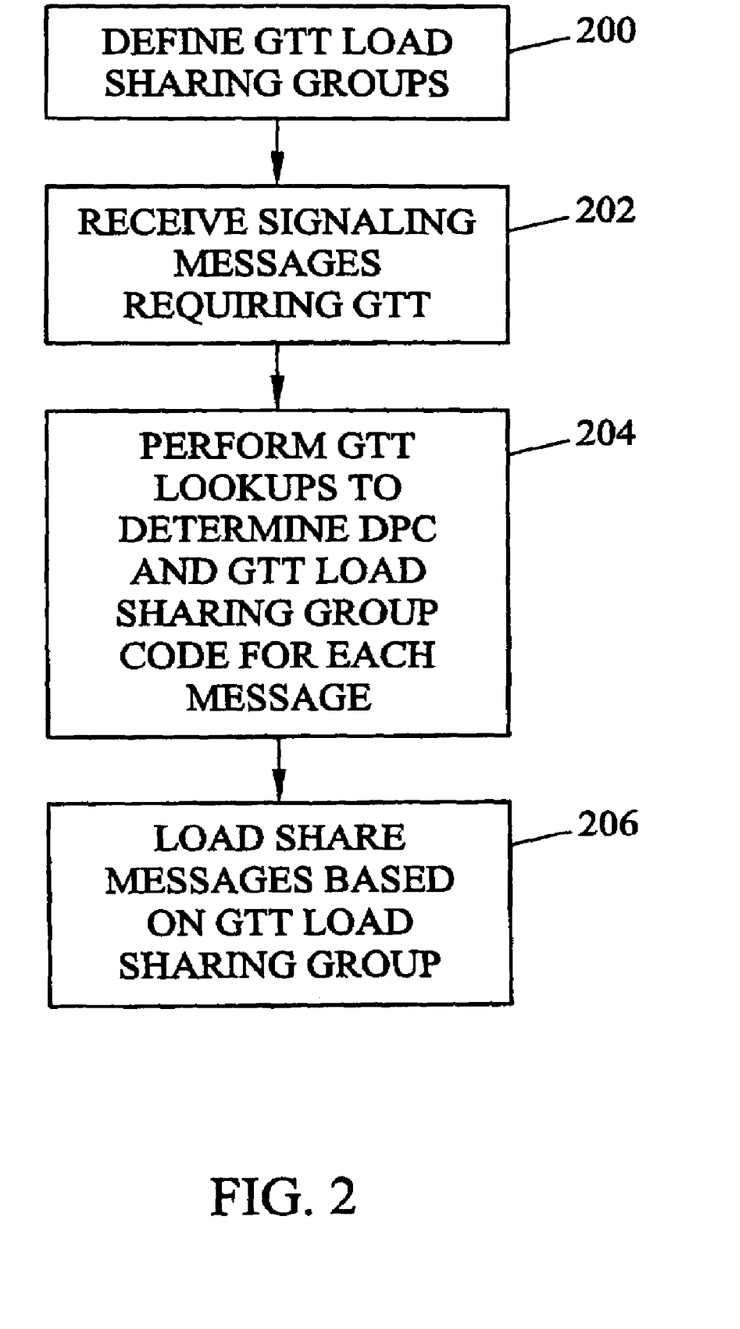
FIG. 2 is a flow chart illustrating exemplary overall steps for flexible GTT load sharing according to an embodiment of the present invention.

FIG. 2 is a flow chart illustrating exemplary overall steps that may be performed by STP 100 in FIG. 1 for flexible GTT load sharing according to an embodiment of the present invention. Referring to FIG. 2, in step 200, a user or operator defines GTT load sharing groups. The load sharing groups may include different combinations of point codes, such as point codes corresponding to SCPs 102, 104, and 106. For example, one load sharing group may include the point codes of SCPs 102 and 104, while another load sharing group may include the point codes of SCPs 102 and 106. The architecture of STP 100 allows such flexible load sharing arrangements and is not limited to a node or point code being associated with a single load sharing group. In addition, different load sharing algorithms may be associated with each of the GTT load sharing groups, even when the GTT load sharing groups have common point codes.

In step 202, STP 100 receives signaling messages requiring global title translation. In step 204, STP 100 performs GTT lookups to determine a destination point code and a GTT load sharing group code for each message. The GTT lookup may be performed based on the SCCP called party address in each message. In step 206, messages are load shared based on the GTT load sharing group. Step 206 may be performed by accessing the GTT load sharing group data within the MAP or MRN table. Once the load sharing group data is accessed, the destination point code for the message may be selected from the point codes in the group using the load sharing algorithm defined for the group. For example, the load sharing algorithm may be any suitable algorithm for selecting among members of the group, such as the preference-based weighted round robin algorithm used by the Eagle® STP and described above. Different weights and/or different load sharing algorithms may be assigned to each group even when the groups include common point codes.

Figure 3:
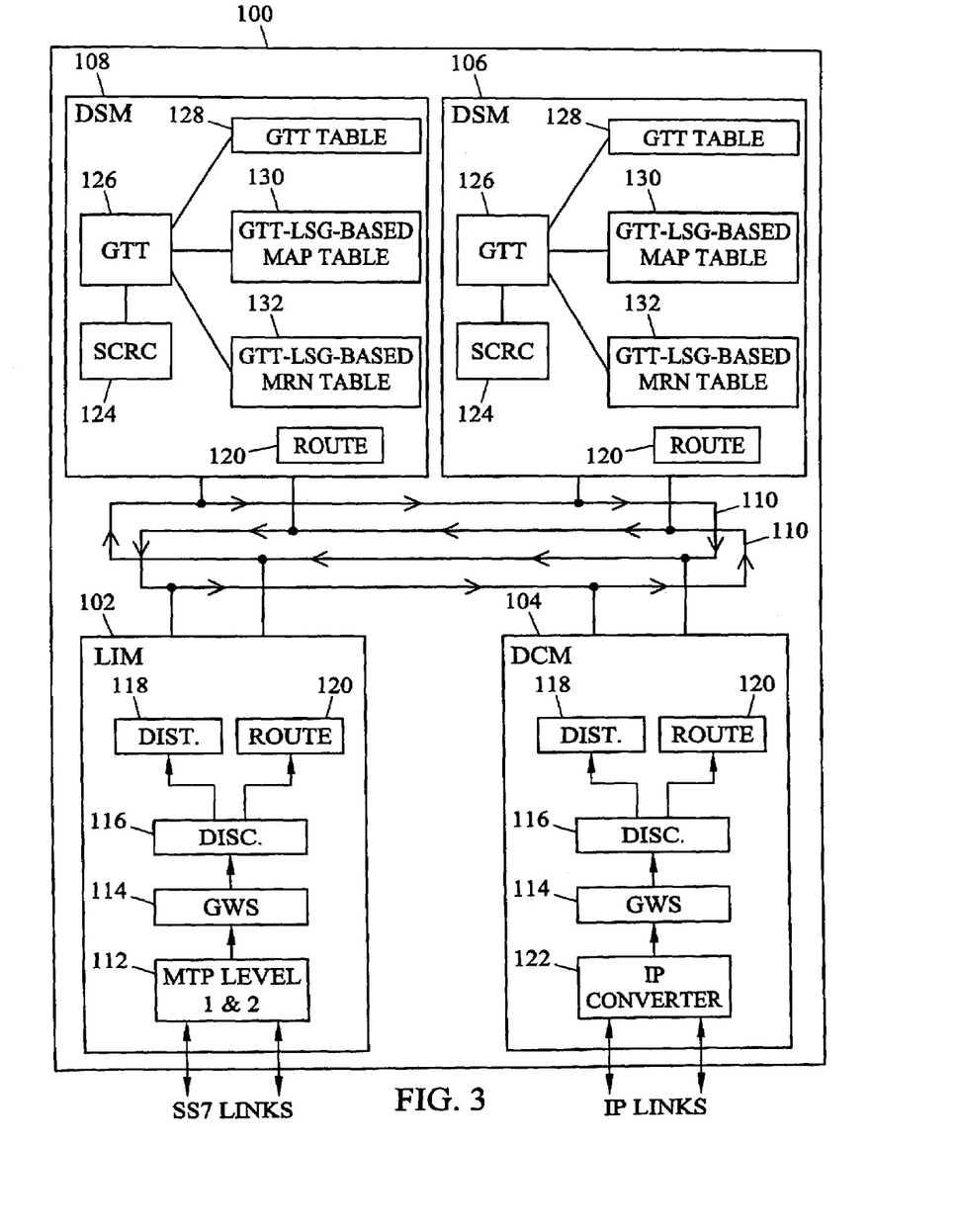
FIG. 3 is a block diagram illustrating an exemplary internal architecture for a signal transfer point including flexible GTT load sharing according to an embodiment of the present invention.

FIG. 3 is a block diagram illustrating an exemplary internal architecture for STP 100. Referring to FIG. 3, STP 100 includes a plurality of internal processing modules 102, 104, 106, and 108. Each processing module 102, 104, 106, and 108 may include a printed circuit board having an application processor and a communications processor mounted thereon. The application processor may perform application level functions, such as message routing and card-specific functions. The communications processor may control communications with other processing modules via a counter-rotating dual-ring bus 110.

In the illustrated example, processing module 102 comprises a link interface module for sending and receiving SS7 messages via SS7 signaling links. Link interface module 102 includes an MTP level 1 and 2 function 112, a gateway screening function 114, a discrimination function 116, a distribution function 118, and a routing function 120. MTP level 1 and 2 function 112 performs MTP level 1 and 2 operations, such as error detection, error correction, and message sequencing. Gateway screening function 114 screens incoming SS7 messages based on the destination point code in each message to determine whether to allow the message into the network. Discrimination function 116 screens messages to determine whether the messages are addressed to STP 100 or to an external node. For messages addressed to STP 100, discrimination function 116 forwards the messages to distribution function 118 for distribution to the appropriate internal processing module. For messages requiring global title translation, discrimination function 116 forwards the messages to distribution function 118. Distribution function 118 then forwards the messages to one of DSMs 106 and 108 for GTT processing. Routing function 120 routes messages that are not addressed to STP 100 to the cards associated with the outbound signaling links corresponding to the point codes in the messages.

Processing module 104 comprises a data communications module for sending and receiving SS7 and/or IP telephony signaling messages over IP signaling links. In the illustrated example, data communications module 104 includes an IP converter 122 and functions 114 though 120 described with regard to link interface module 102. Functions 114–120 perform the same operations described with regard to link interface module 102. Hence, a description thereof will not be repeated herein. IP converter 122 performs the signaling operations necessary for sending and receiving SS7 messages over IP links. For example, IP converter 122 may include an Ethernet layer, an IP layer, a TCP or SCTP layer, and an SS7 adaptation layer. The SS7 adaptation layer may be implemented using M3UA, M2PA, SUA, TALI, or other appropriate SS7 adapter layer, as described in the correspondingly named IETF RFCs.

Modules 106 and 108 are database services modules for performing flexible GTT load sharing according to an embodiment of the present invention. Each database service module 106 and 108 includes a signaling connection routing controller (SCRC) 124 for receiving messages requiring SCCP services and determining the appropriate application for processing the messages. In the illustrated example, SCRC 124 may select global title translation function 126 for messages requiring GTT. Global title translation function 126 accesses a GTT table 128, GTT-load-sharing-group-based MAP table 130, and a GTT-load-sharing-group-based MRN table 132 to perform flexible GTT load sharing. For example, GTT function 126 may perform a lookup in GTT table 128 to determine a group code and a destination point code. GTT function 126 may then perform a lookup in either GTT-LSG-based MAP table 130 or GTT-LSG-based MRN table 132 to perform GTT load sharing. Detailed load sharing examples will be described below. After global title translation, GTT function 126 may forward the messages to routing function 120. Routing function 120 routes the messages to the signaling link associated with the point code determined by GTT function 126.

FLEXIBLE GTT LOAD SHARING EXAMPLES

In one flexible GTT load sharing example, STP 100 shown in FIGS. 1 and 3 may have different GTAs provisioned in GTT tables 128. GTA1, GTA2, and GTA3 are used in final GTT analysis for reaching the SCP end nodes 102, 104, and 106. GTA4, GTA5, and GTA6 are used in intermediate GTT analysis for reaching the STP transit nodes 108 and 110.

With the existing methods, STP 100 would apply the same load sharing relationship between SCP 102, SCP 104, and SCP 106, regardless of whether GTA1, GTA2, or GTA3 is used. Likewise, STP 100 would also apply the same load sharing relationship between STP 108 and STP 110, regardless of whether GAT4, GAT5, or GAT6 is used. However, in one embodiment of a flexible GTT load sharing system of the present invention, the following exemplary relationships, presented in Tables 5 and 6 may be established. The relationships defined in Tables 5 and 6 are based on the GTA in a received signaling message.

TABLE 5

Final GTT Requirements
For final GTT routing to SCP 102, SCP 102, and SCP 106:

| GTA Used | Load sharing Relationship |
|---|---|
| GTA1 | Traffic equally divided between 1-1-1, 2-2-2 and 3-3-3 |
| GTA2 | Traffic equally divided between 1-1-1 and 3-3-3 only |
| GTA3 | All traffic routed to 1-1-1 only, with backup to 2-2-2 |

TABLE 6

Intermediate GTT Requirements
For intermediate GTT routing to STP 108 and STP 110:

| GTA Used | Load sharing Relationship |
|---|---|
| GTA4 | Traffic equally divided between 4-4-4 and 5-5-5 |
| GTA5 | All traffic routed to 4-4-4 only, with backup to 5-5-5 |
| GTA6 | All traffic routed to 5-5-5 only, with backup to 4-4-4 |

In one embodiment, a flexible GTT load sharing system is implemented using GTT load sharing groups in an STP's GTT, MAP, and MRN tables. The use of GTT load sharing groups allows the MAP and MRN tables to be partitioned into subgroups corresponding to each GTT group. The specific GTA digits used to perform the translation may be the pointer into a specific subgroup in either the MAP or MRN table. Different GTAs may point to different subgroups. Alternatively, different GTAs may point to the same GTT load sharing group. Because the MAP and MRN tables can be subdivided by GTT group, it is possible to repeat point codes in different GTT load sharing groups (but not within the same group). Tables 7–9 below illustrate examples of GTT, MAP, and exemplary MRN tables that include GTT load sharing groups according to an embodiment of the present invention. These tables may reside on DSM cards 106 and 108 of STP 100 illustrated in FIG. 3.

TABLE 7

GTT Tables Utilizing GTT Load Sharing Groups

| GTA | PC | GTT Load Sharing Group |
|---|---|---|
| GTA1 | 1-1-1 | aa |
| GTA2 | 1-1-1 | bb |
| GTA3 | 1-1-1 | cc |
| GTA4 | 4-4-4 | aa |
| GTA5 | 4-4-4 | bb |
| GTA6 | 4-4-4 | cc |

TABLE 8

MAP Table Utilizing GTT Load Sharing Groups

| PC/SSN | Rel Cost |
|---|---|
| GTT Load Sharing Group aa | |
| 1-1-1/10 | 10 |
| 2-2-2/10 | 10 |
| 3-3-3/10 | 10 |
| GTT Load Sharing Group bb | |
| 1-1-1/10 | 10 |
| 3-3-3/10 | 10 |
| GTT Load Sharing Group cc | |
| 1-1-1/10 | 10 |
| 2-2-2/10 | 30 |

TABLE 9

MRN Table Utilizing GTT Load Sharing Groups

| PC | Rel Cost |
|---|---|
| GTT Load Sharing Group aa | |
| 4-4-4 | 10 |
| 5-5-5 | 10 |
| GTT Load Sharing Group bb | |
| 4-4-4 | 10 |
| 5-5-5 | 30 |
| GTT Load Sharing Group cc | |
| 5-5-5 | 10 |
| 4-4-4 | 30 |

The GTT load sharing relationships in Tables 7–9 satisfy the routing requirements noted in Tables 5 and 6 above by allowing the same point codes to be defined multiple times within each of the MAP and MRN tables, but with different mate PCs and different relationships, depending upon the GTT group to which they belong. For example, if the global title address in the message is GTA1, the destination point code for the message will be 1-1-1 and the GTT load sharing group will be aa. From Table 8, GTT load sharing group aa includes three point codes all having the same relative cost. Accordingly, the message may be assigned any of the point codes in GTT load sharing group aa depending on the point code assigned to the last message that resulted in access to GTT load sharing group aa.

If a message having global title address GTA5 is selected, from Table 7, the destination point code is 4-4-4 and the GTT load sharing group is bb. From Table 9, GTT load sharing group bb has two destination point codes with different relative costs. Using the preference-based algorithm described above, since the original destination point code for the message is 4-4-4, provided that this point code is available, the final destination point code inserted in a message will be 4-4-4. If 4-4-4 is unavailable, the destination point code 5-5-5 will be assigned to the message.

After the MAP or MRN table has been searched using the PC+GTT load sharing group code, and the destination PC has been chosen based on the relative cost and a load sharing algorithm, STP 100 will search the routing tables and determine the outgoing linksets based on the true point code, i.e., the routing table search preferably does not include the post-GTT group codes. This will allow multiple GTT load sharing relationships without requiring changes to how STP 100 routes messages.

In another flexible GTT load sharing example, a network operator may wish to use the following GTAs for final GTT traffic to SCPs 102, 104, and 106 and intermediate GTT traffic to STPs 108 and 110, under the following conditions:

Final GTT:
GTA=9194601111 can be used to load share traffic equally between all three SCPs
GTA=9194602222 can be used to load share traffic equally between SCP 102 and SCP 104, with SCP 106 being a backup
GTA=9194603333 can be used route all traffic to SCP 102, with SCP 104 and SCP 106 being load sharing backups Intermediate GTT:
GTA=9195491300 can be used to load share traffic equally between both STPs 108 and 110
GTA=9195492300 can be used to route all traffic to STP 108, with STP 110 being a backup Using GTT load sharing group codes, the GTT tables would be provisioned as shown in Table 10:

TABLE 10

GTT Table Using GTT Load Sharing Group Codes

| GTA | PC | SSN | RI |
|---|---|---|---|
| 9194601111 | 1-1-1aa | 8 | 1 (SSN) |
| 9194602222 | 1-1-1bb | 8 | 1 (SSN) |
| 9194603333 | 1-1-1cc | 8 | 1 (SSN) |
| 9195491300 | 4-4-4aa | — | 0 (GT) |
| 9195492300 | 4-4-4bb | — | 0 (GT) |

Likewise, the MAP and MRN tables would be provisioned as shown in Tables 11 and 12:

TABLE 11

MAP Table Using GTT Load Sharing Group Codes

| PC/SSN | Rel Cost | Mate PC/SSN | Rel Cost |
|---|---|---|---|
| 1-1-1aa/8 | 10 | 2-2-2aa/8 | 10 |
|  |  | 3-3-3aa/8 | 10 |
| 1-1-1bb/8 | 10 | 2-2-2bb/8 | 10 |
|  |  | 3-3-3bb/8 | 20 |
| 1-1-1cc/8 | 10 | 2-2-2cc/8 | 20 |
|  |  | 3-3-3cc/8 | 20 |

TABLE 12

MRN Table Using GTT Load Sharing Group Codes

| PC | Rel Cost | Mate PC | Rel Cost |
|---|---|---|---|
| 4-4-4aa | 10 | 5-5-5aa | 10 |
| 4-4-4bb | 10 | 5-5-5bb | 20 |

Because the PC+GTT load sharing group code is treated as a complete point code for SCCP processing in STP 100, STP 100 does not perceive these as duplicate entries. However, when the routing tables are searched, and when the STP 100 places the destination PC into the MTP routing label of the outgoing MSU, the load sharing group codes are preferably removed, leaving only the true point code for route and linkset selection.

In the embodiments described above, global title address values are used to select GTT load sharing groups. In an alternate embodiment of the flexible GTT load sharing system of the present invention, global title address may be used in combination with other parameters to select GTT load sharing groups. Using parameters in addition to the global title address to select a GTT load sharing group allows the same global title address to be assigned to different GTT load sharing groups. The signaling message parameters used in addition to the global title address to select the GTT load sharing group may include the message transfer part (MTP) origination point code (OPC), the SCCP subsystem (SSN), the global title indicator (GTI), the translation type (TT), the numbering plan (NP), the nature of address indicator (NAI), calling party address information, the TCAP opcode, and/or mobile application part (MAP) information. Calling party address information that may be used to select the GTT load sharing group may include the SCCP calling party address (CgPA) or calling subscriber identification information contained in any of the SCCP, TCAP, MAP or SUA layers of a signaling message. The following example illustrates load sharing relationships defined based on GTA/CgPA combinations:

Final GTT:
GTA=9194601111 and CgPA=9193801111 can be used to load share traffic equally between all three SCPs 102, 104, and 106
GTA=9194601111 and CgPA=9193801112 can be used to load share traffic equally between SCP 102 and SCP 104, with SCP 106 being a backup
GTA=9194601111 and CgPA=9193801113 can be used route all traffic to SCP 102, with SCP 104 and SCP 106 being load sharing backups Intermediate GTT:
GTA=9195491300 and CgPA=9193801111 can be used to load share traffic equally between both STPs 108 and 110
GTA=9195491300 and CgPA=9193801112 can be used to route all traffic to STP 108, with STP 110 being a backup Table 13 shown below illustrates an exemplary structure for a GTT table to implement these load sharing relationships.

TABLE 13

GTT Table Using GTT Load Sharing Group Codes

| GTA | CgPA | PC | SSN | RI |
|---|---|---|---|---|
| 9194601111 | 9193801111 | 1-1-1aa | 8 | 1 (SSN) |
| 9194601111 | 9193801112 | 1-1-1bb | 8 | 1 (SSN) |

TABLE 13-continued

GTT Table Using GTT Load Sharing Group Codes

| GTA | CgPA | PC | SSN | RI |
|---|---|---|---|---|
| 9194601111 | 9193801113 | 1-1-1cc | 8 | 1 (SSN) |
| 9195491300 | 9193801111 | 4-4-4aa | — | 0 (GT) |
| 9195491300 | 9193801112 | 4-4-4bb | — | 0 (GT) |

Likewise, the MAP and MRN tables would be provisioned as shown in Tables 14 and 15:

TABLE 4

MAP Table Using GTT Load Sharing Group Codes

| PC/SSN | Rel Cost | Mate PC/SSN | Rel Cost |
|---|---|---|---|
| 1-1-1aa/8 | 10 | 2-2-2aa/8 | 10 |
|  |  | 3-3-3aa/8 | 10 |
| 1-1-1bb/8 | 10 | 2-2-2bb/8 | 10 |
|  |  | 3-3-3bb/8 | 20 |
| 1-1-1cc/8 | 10 | 2-2-2cc/8 | 20 |
|  |  | 3-3-3cc/8 | 20 |

TABLE 15

MRN Table Using GTT Load Sharing Group Codes

| PC | Rel Cost | Mate PC | Rel Cost |
|---|---|---|---|
| 4-4-4aa | 10 | 5-5-5aa | 10 |
| 4-4-4bb | 10 | 5-5-5bb | 20 |

Thus, as described above, the present invention includes methods, systems, and computer program products for flexible GTT load sharing. In one exemplary implementation, GTT load sharing is performed by associating global title addresses with GTT load sharing groups. In another example, global title addresses may be combined with other message parameters and associated with GTT load sharing groups. Each GTT load sharing group includes sets of point codes among which load sharing is performed. Because point codes are divided into load sharing groups, point codes are not required to be unique in the GTT load sharing tables. In addition, different load sharing algorithms can be defined for different load sharing groups. As a result, the same point code can be associated with different load sharing algorithms, depending on the GTT load sharing group in which it appears.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for flexible global title translation (GTT) load sharing, the method comprising:
    (a) defining GTT load sharing groups, the GTT load sharing groups each including at least one point code, wherein at least one of the point codes appears in more than one of the GTT load sharing groups;
    (b) receiving signaling messages requiring GTT;
    (c) performing GTT lookups for the signaling messages to determine GTT load sharing groups for the messages; and
    (d) load sharing the signaling messages using the GTT load sharing groups.

2. The method of claim 1 wherein defining GTT load sharing groups includes associating a load sharing group code with each entry in a GTT table.

3. The method of claim 2 wherein load sharing the signaling messages includes performing a lookup in the GTT table to extract a destination point code and a GTT load sharing group code, using the GTT load sharing group code to select one of the GTT load sharing groups, and selecting a destination point code within the group using a load sharing algorithm.

4. The method of claim 3 wherein selecting a destination point code within the group using a load sharing algorithm includes selecting a point code within the group based on relative weights assigned to point codes in the group.

5. The method of claim 4 wherein selecting a point code from the group based on relative weights assigned to point codes in the group includes selecting point codes with a preference given to the destination point code extracted from the GTT table.

6. The method of claim 3 wherein selecting a destination point code within the group using a load sharing algorithm includes selecting a destination point code within the group based on a round robin algorithm.

7. The method of claim 3 wherein selecting a destination point code within the group using a load sharing algorithm includes selecting the destination point code using a lowest cost algorithm.

8. The method of claim 1 wherein defining GTT load sharing groups includes defining GTT load sharing groups having different load sharing algorithms.

9. The method of claim 1 wherein defining GTT load sharing groups includes defining GTT load sharing groups that are unique to global title addresses.

10. The method of claim 1 wherein defining GTT load sharing groups includes associating a plurality of global title addresses with the same GTT load sharing group.

11. The method of claim 1 wherein defining GTT load sharing groups includes associating a global title address in combination with at least one additional message parameter with each GTT load sharing group.

12. The method of claim 11 wherein the additional message parameter includes a signaling connection control part (SCCP) parameter.

13. The method of claim 12 wherein the SCCP parameter includes a calling party SCCP parameter.

14. The method of claim 13 wherein the calling party SCCP parameter includes an SCCP calling party address.

15. The method of claim 11 wherein the at least one additional message parameter includes a transaction capabilities application part (TCAP) parameter.

16. The method of claim 11 wherein the additional message parameter includes a mobile application part (MAP) message parameter.

17. The method of claim 1 wherein receiving signaling messages requiring GTT includes receiving SS7 signaling messages requiring GTT.

18. The method of claim 1 wherein receiving signaling messages requiring GTT includes receiving SCCP user adaptation (SUA) layer messages requiring GTT.

19. The method of claim 18 wherein load sharing the signaling messages using the GTT load sharing groups includes load sharing the signaling messages based on parameters in the SUA messages used to identify a node or an application running on a node.

20. The method of claim 19 wherein the parameters in the SUA messages used for load sharing include parameters in the source or destination address fields of the SUA messages.

21. The method of claim 19 wherein the parameters in the SUA messages used for load sharing include parameters in the routing context fields of the SUA messages.

22. A system for flexible global title translation load sharing, the system comprising:
(a) a global title translation function for performing GTT lookup for signaling messages requiring global title translation;
(b) a global title translation table accessible by the GTT function for associating global title addresses with destination point codes and GTT load sharing group codes;
(c) a load sharing group table accessible by the GTT function for associating the GTT load sharing group codes with GTT load sharing groups, wherein the GTT function is adapted to select a point code to insert in each signaling message from the GTT load sharing group associated with each message; and
(d) a routing function for routing messages to the point code selected from the GTT load sharing groups.

23. The system of claim 22 wherein the GTT load sharing groups include a first GTT load sharing group having a first load sharing algorithm and a second load sharing group having a second load sharing algorithm differing form the first load sharing algorithm.

24. The system of claim 22 wherein the GTT load sharing groups include a first load sharing group having a first point code and a second GTT load sharing group having the first point code.

25. The system of claim 22 wherein the GTT load sharing groups are uniquely associated with global title addresses.

26. The system of claim 22 wherein a plurality of global title addresses are associated with the same GTT load sharing group.

27. The system of claim 22 wherein each GTT load sharing group is associated with a global title address and at least one additional message parameter.

28. The system of claim 27 wherein the at least one additional message parameter includes a signaling connection control part (SCCP) parameter.

29. The system of claim 28 wherein the SCCP parameter includes a calling party parameter.

30. The system of claim 29 wherein the calling party parameter includes an SCCP calling party address.

31. The system of claim 27 wherein the at least one additional parameter includes a transaction capabilities application part (TCAP) parameter.

32. The system of claim 27 wherein the at least one additional parameter includes a mobile application part (MAP) parameter.

33. The system of claim 27 wherein the at least one additional message parameter includes an SCCP user adaptation (SUA) layer parameter.

34. A computer program product comprising computer-executable instructions embodied in a computer-readable medium for performing steps comprising:
(a) defining GTT load sharing groups, the GTT load sharing groups each including at least one point code, wherein at least one of the point codes appears in more than one of the GTT load sharing groups;
(b) receiving signaling messages requiring GTT;
(c) performing GTT lookups for the signaling messages to determine GTT load sharing groups for the messages; and
(d) load sharing the signaling messages using the GTT load sharing groups.

35. The computer program product of claim 34 wherein defining GTT load sharing groups includes associating a load sharing group code with each entry in a GTT table.

36. The computer program product of claim 35 wherein load sharing the signaling messages includes performing a lookup in the GTT table to extract a destination point code and a GTT load sharing group code, using the GTT load sharing group code to select one of the GTT load sharing groups, and selecting a destination point code within the group using a load sharing algorithm.

37. The computer program product of claim 36 wherein selecting a destination point code within the group using a load sharing algorithm includes selecting a point code within the group based on relative weights assigned to point codes in the group.

38. The computer program product of claim 37 wherein selecting a point code from the group based on relative weights assigned to point codes in the group includes selecting point codes with a preference given to the destination point code extracted from the GTT table.

39. The computer program product of claim 36 wherein selecting a destination point code within the group using a load sharing algorithm includes selecting a destination point code within the group based on a round robin algorithm.

40. The computer program product of claim 36 wherein selecting a destination point code within the group using a load sharing algorithm includes selecting the destination point code using a lowest cost algorithm.

41. The computer program product of claim 34 wherein defining GTT load sharing groups includes defining GTT load sharing groups having different load sharing algorithms.

42. The computer program product of claim 34 wherein defining GTT load sharing groups includes defining GTT load sharing groups that are unique to global title addresses.

43. The computer program product of claim 34 wherein defining GTT load sharing groups includes associating a plurality of global title addresses with the same GTT load sharing group.

44. The computer program product of claim 34 wherein defining GTT load sharing groups includes associating a global title address in combination with at least one additional message parameter with each GTT load sharing group.

45. The computer program product of claim 44 wherein the at least one additional message parameter includes a signaling connection control part (SCCP) parameter.

46. The computer program product of claim 45 wherein the SCCP parameter includes a calling party SCCP parameter.

47. The computer program product of claim 46 wherein the calling party SCCP parameter includes an SCCP calling party address.

48. The computer program product of claim 45 wherein the at least one additional message parameter includes a transaction capabilities application part (TCAP) parameter.

49. The computer program product of claim 45 wherein the at least one additional message parameter includes a mobile application part (MAP) message parameter.

50. The computer program product of claim 45 wherein the at least one additional message parameter includes an SCCP user adaptation (SUA) layer parameter.

* * * * *